INTERLACED SCANNING IN A TELEVISION SYSTEM

Filed May 27, 1948 2 Sheets-Sheet 1

Inventor:
Richard Jenkins

By J. L. Whittaker
ATTORNEY

April 10, 1951 R. JENKINS 2,548,219

INTERLACED SCANNING IN A TELEVISION SYSTEM

Filed May 27, 1948 2 Sheets-Sheet 2

Inventor:
Richard Jenkins
By J. L. Whittaker
ATTORNEY

Patented Apr. 10, 1951

2,548,219

UNITED STATES PATENT OFFICE 2,548,219

INTERLACED SCANNING IN A TELEVISION SYSTEM

Richard Jenkins, Philadelphia, Pa., assignor to Radio Corporation of America, a corporation of Delaware Application May 27, 1948, Serial No. 29,480

5 Claims. (Cl. 178—69.5)

This invention relates to television scanning systems and more particularly to improvements in even-line interlacing systems of the type described in U. S. Patent No. 2,293,147, issued August 18, 1942, to R. D. Kell et al.

The principal object of the present invention is to provide an interlacing system of the even-line or field displacement type wherein positive locking between the interlace generators at the transmitter and the receiver is secured, thus preventing false or reversed interlacing.

Another object of the invention is to provide an interlacing system adapted for use in a time sharing multiplex television system, in that the number of channels is not restricted by interlace considerations.

A further object is to provide a system of interlace synchronization employing a synchronizing pulse which may be transmitted with the usual vertical sync pulse during the vertical blanking period, without interference with sweep synchronization.

Figure 1:
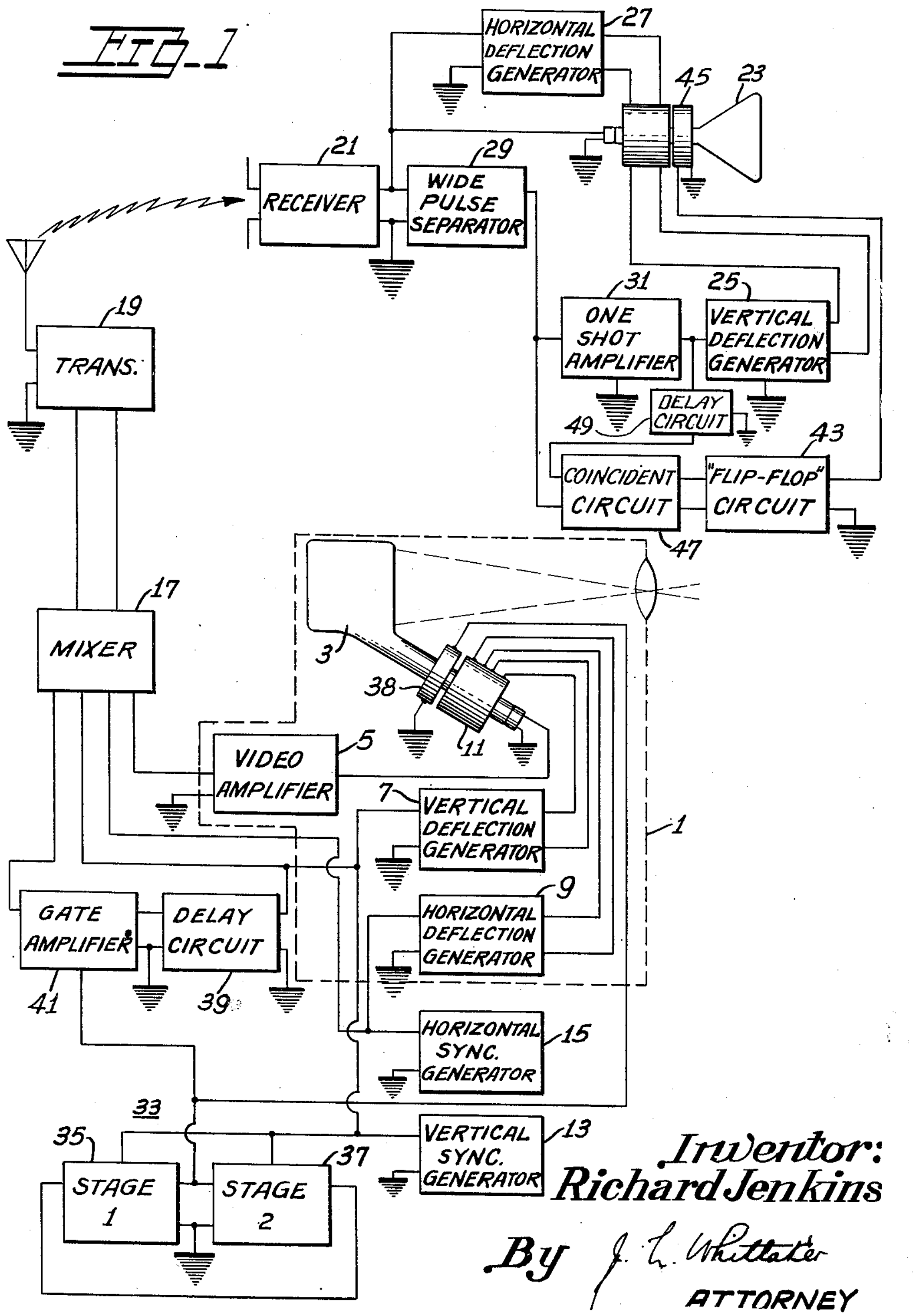

The invention will be described with reference to the accompanying drawings, wherein:

Figure 1 is a schematic diagram of a television system which embodies the instant invention, Figures 2, 3, 4 and 5 are oscillograms illustrating voltages occurring at various steps in the production of interlace synchronization signals in the system of Figure 1, and Figures 6, 7, 8 and 9 are oscillograms illustrating voltages occurring at various steps in the production of an interlace deflection signal in the system of Figure 1.

The television system shown in Figure 1 includes at one station a transmitter 19, synchronizing signal generators 13 and 15 (hereinafter referred to as "sync" generators), and a television camera 1. The camera 1 includes a pickup tube 3 provided with a deflection yoke 11 which is energized by deflection generators 7 and 9, and a video amplifier 5. At another station there is a receiver 21, a picture display device comprising a cathode ray oscilloscope tube 23 and deflection generators 25 and 27, and sync separator means including a wide pulse separator circuit 29.

The apparatus described thus far is substantially the same as that embodied in certain types of prior art systems, and its operation is well known to those skilled in the television art. The pickup tube 3 includes means producing a cathode ray beam which scans an image area over a pattern of horizontal lines, and provides a video signal representing the picture to be reproduced at the receiver station. The vertical and horizontal sync generators 13 and 15 provide timing pulses which control the deflection generators 7 and 9 respectively. These pulses are combined in a mixer 17 with the video signal from the camera 1, and the composite signal is transmitted by the transmitter 19. In order to enable separation of the vertical and horizontal sync pulses at the receiver, the vertical sync pulses are made relatively wide, say ten microseconds, and the horizontal sync pulses are relatively narrow, for example, two microseconds.

The output of the receiver 21 is substantially the same as that of the mixer 17. The wide pulse separator 29 passes only the ten microsecond pulses, rejecting the horizontal sync and video signals. The wide pulses are passed through a "one-shot" amplifier 31, which will be described later, to the vertical deflection generator 25. The horizontal deflection generator 27 responds to the horizontal sync pulses. The deflection generators 25 and 27 energize respective windings of a deflection yoke 33 on the tube 23, causing the cathode ray beam therein to move in synchronism with that of the pickup tube 3.

Interlaced scanning is used to minimize flicker of the reproduced picture. Interlacing involves the scanning of a series of spaced horizontal lines, followed by scanning another series of spaced horizontal lines, and so on until the complete picture area has been covered. For example, the odd lines 1, 3, 5, etc. may be scanned first, from the top to the bottom of the image area; this is called a "field." Each field of odd lines is followed immediately by a similar field consisting of the even lines 2, 4, 6, etc. A complete scan, including both fields, is a "frame."

When two fields per frame are used, as in the above example, two-to-one interlacing is the result. More fields per frame, for instance three or four, may be used, giving three-to-one or four-to-one interlace. In the system of the instant invention, as in the aforementioned Kell et al. patent, interlacing is produced by auxiliary vertical deflection means which shifts the scanning pattern up or down at the beginning of each field, by a distance approximately equal to the vertical spacing between the horizontal lines. The present system is an improvement over that of said Kell et al. patent in that the interlace deflection means at the transmitter end at the receiver are interlocked so that it is impossible for one scanning pattern to be shifted upward while the other is shifted downward, and no human intervention is required to maintain proper interlace. While such interlocking or synchronization is not absolutely necessary for practical operation of a simple single channel system using two-to-one interlace, it is essential for interlacing in a multiplex system like that described in copending U. S. patent application Serial Number 785,335, filed November 12, 1947, now Patent No. 2,527,967 granted October 31, 1950, by Harold J. Schrader, and entitled Multiplex Transmission of Television Signals.

The interlace deflection generator 33 at the transmitter station comprises two (assuming two-to-one interlace is to be used) trigger circuits 35 and 37, connected in a closed ring so that cessation of output from one trigger circuit will initiate output from the other. The trigger circuits may be multivibrators, gas filled discharge tube circuits, or other known devices having two states of stability and the characteristic of being thrown or triggered from on state to the other by a control pulse. Trigger pulses are supplied to both of the circuits 35 and 37 from the vertical sync generator 13. The output of one of the trigger circuits, in this case the first stage 35, is applied to an auxiliary vertical deflection yoke 38 on the camera pickup tube 3. Alternatively the trigger circuit output may be applied to the vertical deflection winding of the scanning yoke 11, in addition to the vertical deflection signal from the generator 7. At present, however, it is preferred to use a separate winding for the interlace deflection, as shown.

A pulse delay circuit 39 is supplied with vertical sync pulses from the generator 13, and its output is applied to a gate amplifier 41. The amplifier 41 is simply an ordinary amplifier, designed to pass vertical sync pulses, but normally biassed to cutoff. The interlace deflection signal from the generator 33 is applied to the amplifier 41 in opposition to the bias, overcoming said bias to allow the amplifier 41 to operate only during positive excursions of the interlace deflection signal. The output of the gate amplifier 41 is applied to the mixer 17. To simplify the circuits required at the receiver, it is preferable, though not essential, that the delay introduced by the network 39 be equal to an integral number of line (horizontal deflection) intervals.

At the receiver station, the interlace deflection signal is generated by a trigger circuit 43, which is preferably a so-called "flip-flop" circuit of the well-known Eccles-Jordan type, of asymmetric design so that it has but one truly stable condition, and a metastable condition in which it will remain for a predetermined period after being triggered by an input pulse, returning to the first condition at the end of said period. Such circuits are known in the radar art as "one shot" multivibrators. The circuit 43 is designed to hold its metastable condition for a period approximately equal to one field period.

The output of the circuit 43 is applied to an auxiliary deflection coil 45 on the picture display tube 23, or may be added directly to the output of the vertical deflection generator 25. Triggering pulses are applied to the circuit 43 from a coincidence circuit 47, which may be a discharge tube including two control grids and biassed so that it provides an output pulse only when input pulses are applied simultaneously to the grids. The coincidence circuit 47 is connected to the output of the wide pulse separator 29, and through a delay circuit 49 to the "one shot" amplifier 31.

The delay circuit 49 is designed to introduce substantially the same delay as the circuit 39 at the transmitter. The "one shot" amplifier 31 is designed to pass a single vertical sync pulse, but in so doing to bias itself to cutoff, remaining in cutoff condition for a considerable period, of the order of one field period, after which it will again pass one pulse.

Figures 2, 3, 4, 5, 6, 7, 8, 9:
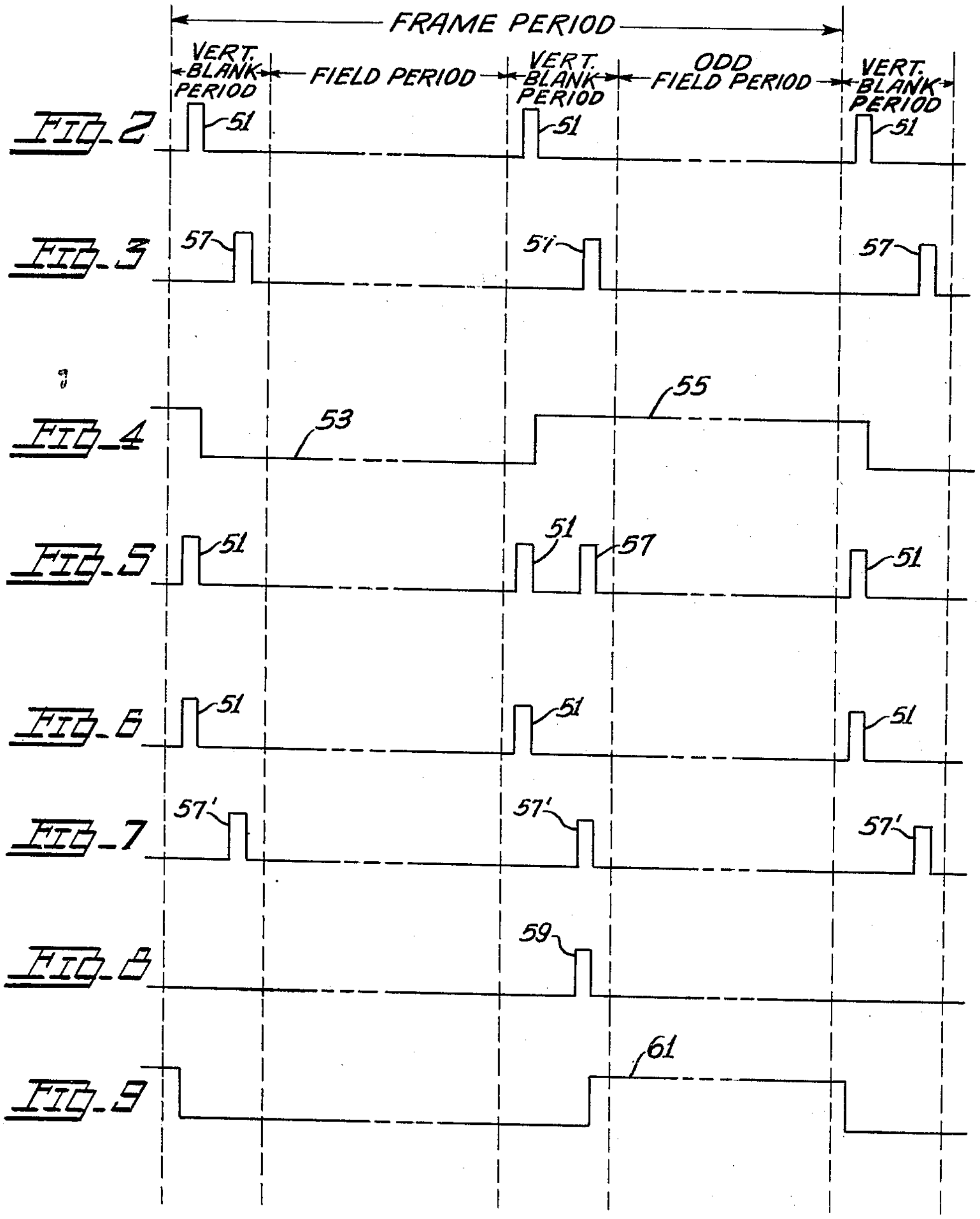

The operation of the described interlacing system is as follows:

Each vertical sync pulse from the generator 13 actuates both trigger circuits 35 and 37, keying the one which was formerly "on" (i. e. providing maximum output) to its "off" condition, and vice versa. Referring to Figure 2, a vertical sync pulse 51 appears at the beginning of each field period. Figure 4 shows the resulting output from the circuit 35, comprising a rectangular wave alternating between upper and lower levels 53 and 55 at the frame repetition frequency. This is the interlace deflection signal which shifts the scanning pattern in the camera tube 3 up and down.

Figure 3 shows the output of the delay circuit 41, comprising delayed vertical sync pulses 57. When the interlace deflection signal is at its lower level 53 (Figure 4), the gate amplifier 41 is cut off, and the delayed vertical sync pulse is not passed. When the interlace deflection signal is at its upper level 55, the amplifier 41 operates and passes a delayed vertical sync pulse, which constitutes an interlace sync pulse and is transmitted with the vertical sync pulse at the beginning of each alternate, or odd, field. The combined vertical sync and interlace sync signals produced during a complete frame period are shown in Figure 5. This composite signal is transmitted and received at the receiver 21, together with the video and horizontal sync signals. The latter are rejected by the wide pulse separator 29, whose output is a duplicate of the signal of Figure 5.

The "one-shot" amplifier 31 passes only the vertical sync pulses 51, rejecting the interlace pulses 57. Its output is shown in Figure 6, and is the same as that of the vertical sync generator 13 at the transmitter station, shown in Figure 2. The reproduced vertical sync signal of Figure 6 is delayed by the delay circuit 49, providing a train of pulses 57′ like the pulses 57 of Figure 3. This signal is applied to one input terminal of the coincidence circuit 47, while the output of the wide pulse selector, corresponding to Figure 5, is applied to the other input terminal. Comparison of Figures 5 and 7 shows that pulses will appear coincidentally at both of said input terminals only at the beginning of each alternate field period, when the interlace pulse 57 is present in the transmitted signal.

The output of the coincidence circuit 47 comprises a pulse 59, coincident with the interlace sync pulse 57. The pulse 59, when it appears throws the flip-flop circuit 43 from its stable condition to the metastable condition, providing an output pulse 61 (see Figure 9) which persists during the ensuing field period. This energizes the interlace deflection coil 45 on the reproducing tube 23 to shift the scanning pattern vertically in the same manner as that of the camera tube 3 at the transmitter is shifted by the wave of Figure 4.

It will be apparent from the foregoing description that the interlace deflection means at the receiver is positively locked in step with that at the transmitter, obviating the necessity for any manual control to prevent the pattern at the receiver from moving up while that at the transmitter is moving down. As mentioned above, this is an advantage in a single channel television system, but a necessity in a multiple channel time division system. The reason for this is that in a single channel system, there are only two possibilities, i. e. correct interlace and inverted interlace; in a multiple channel system, there is still but one possible correct interlace, but $(2n-1)$ possible incorrect interlaces, where $n$ is the number of channels.

The principles of the system of Figure 1 may be extended to provide higher order interlaces, such as three to one or four to one, by using a corresponding number of trigger stages in the interlace deflection generator at the transmitter, with an additional delay circuit and gate amplifier for each additional trigger stage. A correspondingly additional number of flip-flop circuits 43, coincidence circuits 47, and delay circuits 49 are required at the receiver.

A brief résumé of the above-described invention follows: Even-line interlacing is provided by auxiliary vertical deflection or interlace generators at the transmitter and receiver. These generators are locked in step by special synchronizing pulses derived from the vertical sync pulses at the transmitter and utilized at the receiver to trigger the interlace deflection generator.

I claim as my invention:

1. In a television system including a television camera, synchronizing signal generator means supplying vertical and horizontal synchronizing signals to said camera, a picture reproducing device including vertical and horizontal deflection means and means supplying said synchronizing signals respectively to said deflection means, and auxiliary vertical deflection means for said camera and similar auxiliary vertical deflection means for said reproducing device, said auxiliary deflection means operating at a frequency which is a fraction of that of said vertical synchronizing signal to produce electrically interlaced scanning in said camera and said reproducing device: a system for controlling said auxiliary deflection means at said reproducing device, comprising, at said camera, a delay network, means applying said vertical synchronizing signals to said delay network to produce delayed vertical synchronizing signals, and keying means responsive to said auxiliary vertical deflection means at said camera to pass said delayed vertical synchronizing signals only at intervals equal to the period of operation of said auxiliary vertical deflection means to provide a train of code signals; a second delay network at said reproducing device, means applying said undelayed vertical synchronizing signals to said second delay device to provide delayed vertical synchronizing signals, and means responsive to coincidence of a said code signal with one of said last mentioned delay vertical synchronizing pulses to operate said auxiliary vertical deflection means at said reproducing device.

2. A television system for providing interlacing by displacement of successive image fields with respect to a scanning pattern, comprising means for transmitting video signals during discrete field periods, means for transmitting synchronizing pulses between said field periods, means for producing pulses delayed in time with respect to said synchronizing pulses, means for suppressing alternate ones of said delayed pulses to provide a train of code pulses, means for transmitting said video signals, said synchronizing pulses and said code pulses, means for receiving said transmitted signal and separating therefrom said video signals to produce an image, means for delaying said received synchronizing pulses, means for comparing said received synchronizing pulses after performing the delaying step thereon with said code pulses to obtain a coincidence signal, and means for producing in response to said coincidence signal a change in the position of the image produced by video signals.

3. A television system for providing interlaced scanning by periodic displacement of the scanning pattern in the television camera and in the picture reproducing device, comprising means for synchronizing said vertical displacement at said reproducing device with that at said camera which includes means for producing and transmitting a train of synchronization signals, said signals comprising single pulses and double pulses in alternate succession, means for receiving said synchronization signals, means for delaying said received synchronization signals by an amount substantially equal to the spacing between those of a pair of said double pulses, and means for comparing said received and delayed signal with said signal as received to initiate an interlace deflection signal upon coincidence of a delayed received pulse with an undelayed received pulse.

4. In a television system including a television camera, means supplying vertical synchronizing signals to said camera, a picture reproducing device and means supplying said synchronizing signals to said reproducing device, and auxiliary vertical deflection means for said camera and similar auxiliary vertical deflection means for said reproducing device, said auxiliary deflection means operating at a frequency which is a fraction of that of said vertical synchronizing signal to produce interlaced scanning in said camera and said reproducing device: a system for controlling said auxiliary deflection means at said reproducing device, comprising, at said camera, means responsive to said vertical synchronizing signals to produce delayed vertical synchronizing signals, and means responsive to said auxiliary vertical deflection means at said camera to pass said delayed vertical synchronizing signals only at intervals equal to the period of operation of said auxiliary vertical deflection means to provide a train of code signals; a delay network at said reproducing device, means applying said undelayed vertical synchronizing signals to said delay device to provide delayed vertical synchronizing signals, and means responsive to coincidence of a said code signal with one of said last mentioned delayed vertical synchronizing pulses to operate said auxiliary vertical deflection means at said reproducing device.

5. A television system for providing interlacing by vertical displacement of alternate image fields with respect to a scanning pattern, comprising means for transmitting two sets of video signals alternately, means for interspersing synchronizing pulses among said sets of video signals, means for producing a series of code pulses delayed in time with respect to said synchronizing pulses, means for suppressing alternate ones of said delayed code pulses, means for transmitting said sets of video signals, said synchronizing pulses and said delayed code pulses, means for receiving said transmitted signal and separating therefrom said sets of video signals to produce an image, means for delaying said received undelayed synchronizing pulses, means for comparing said received undelayed pulses after performing the delaying step thereon with said code pulses to obtain a coincidence signal, means for utilizing said coincidence signal to produce a signal having alternative amplitude levels and means for utilizing said last-mentioned signal to change the position of the image produced by one of said sets of video signals.

RICHARD JENKINS.

REFERENCES CITED

The following references are of record in the file of this patent:

UNITED STATES PATENTS

| Number | Name | Date |
|---|---|---|
| 2,277,000 | Bingley | Mar. 17, 1942 |
| 2,293,148 | Kell | Aug. 18, 1942 |
| 2,296,908 | Crosby | Sept. 29, 1942 |
| 2,309,506 | Herbst | Jan. 26, 1943 |
| 2,389,646 | Sleeper | Nov. 27, 1945 |